Dec. 29, 1936. A. T. FAY, JR 2,065,673
STACKER OR LOADER
Filed July 25, 1932 5 Sheets-Sheet 1
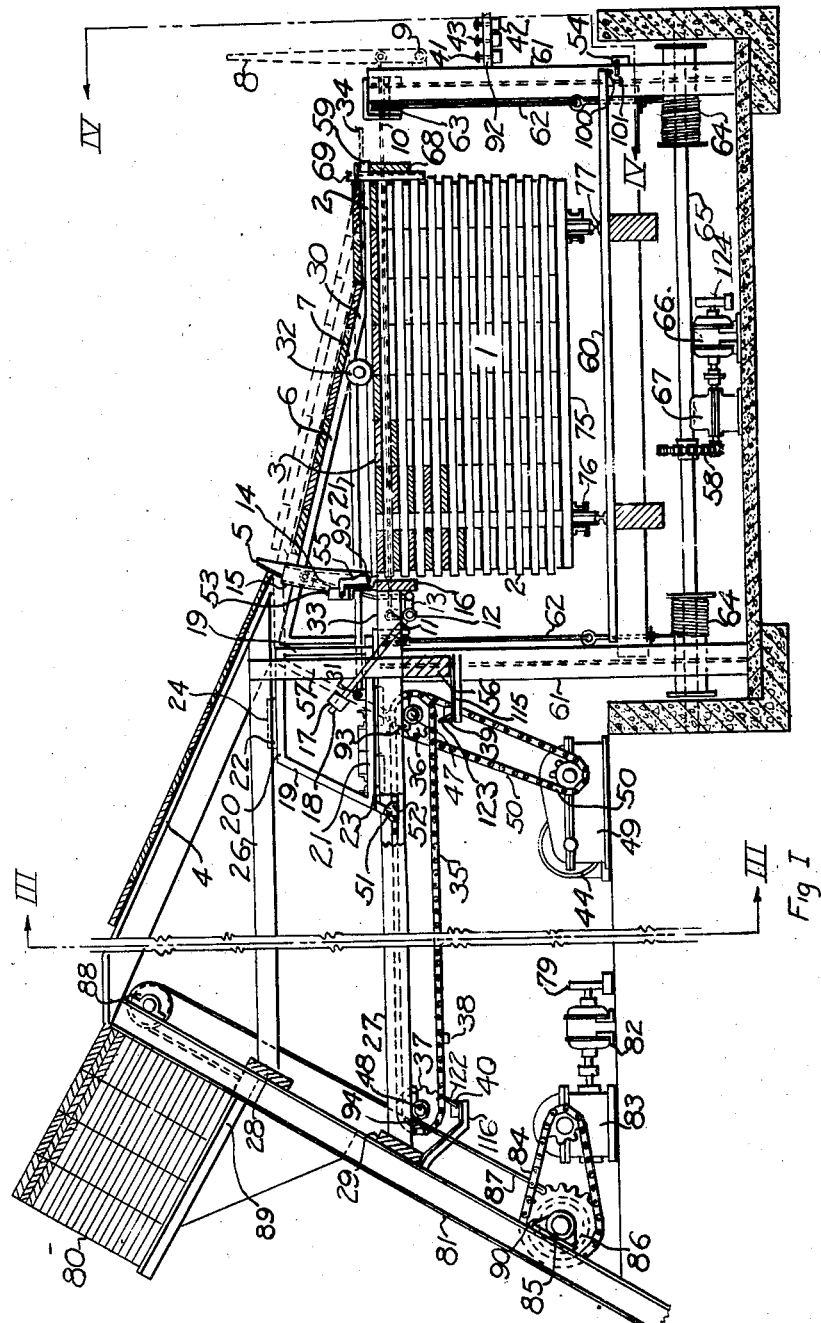
Fig I
INVENTOR
Albert Thornton Fay Jr.

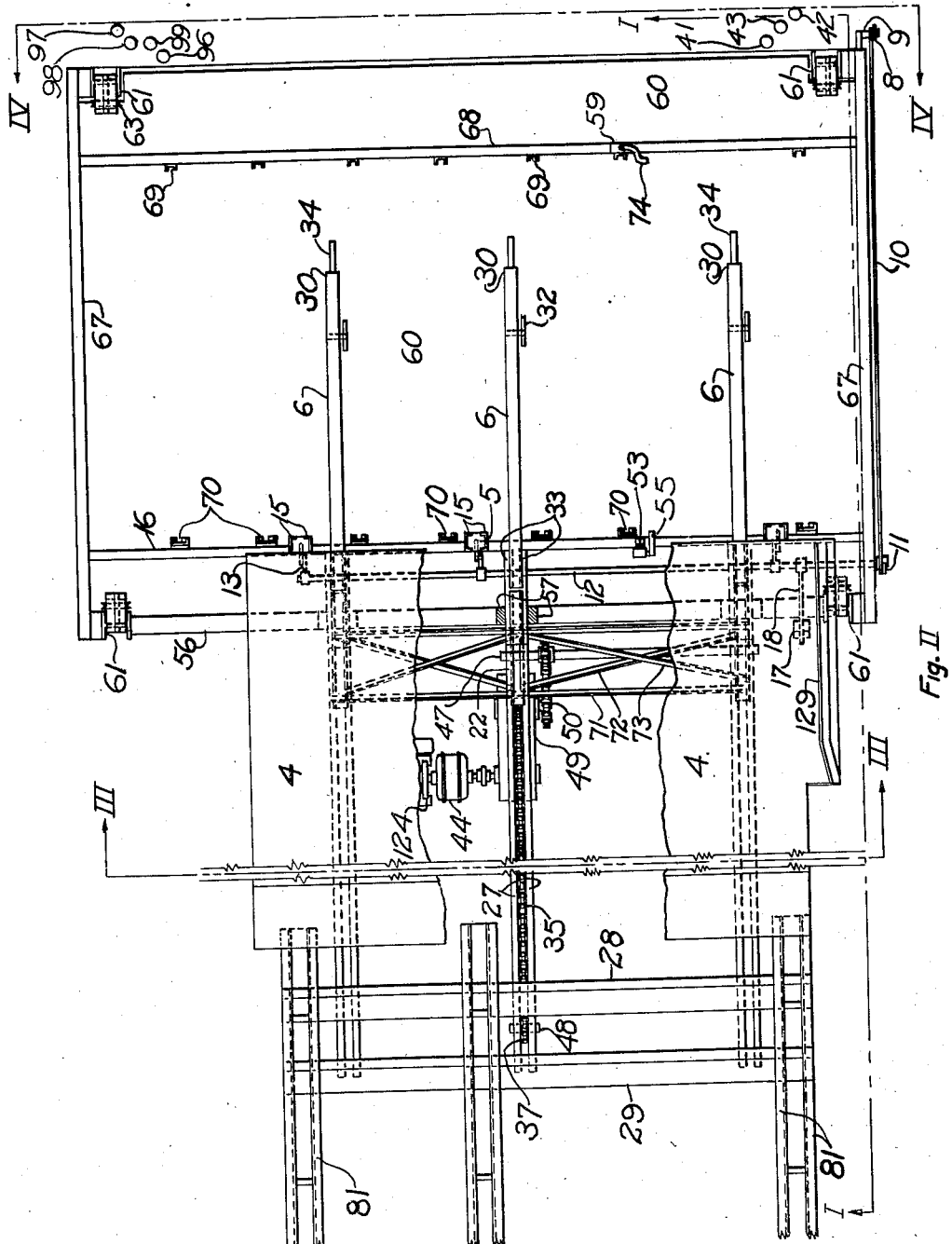

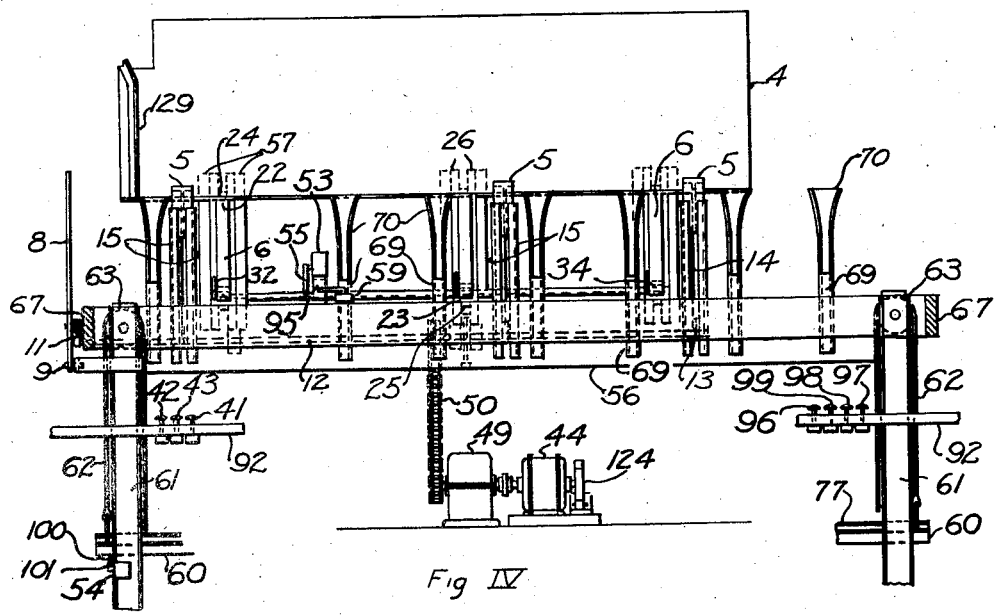
Fig IV
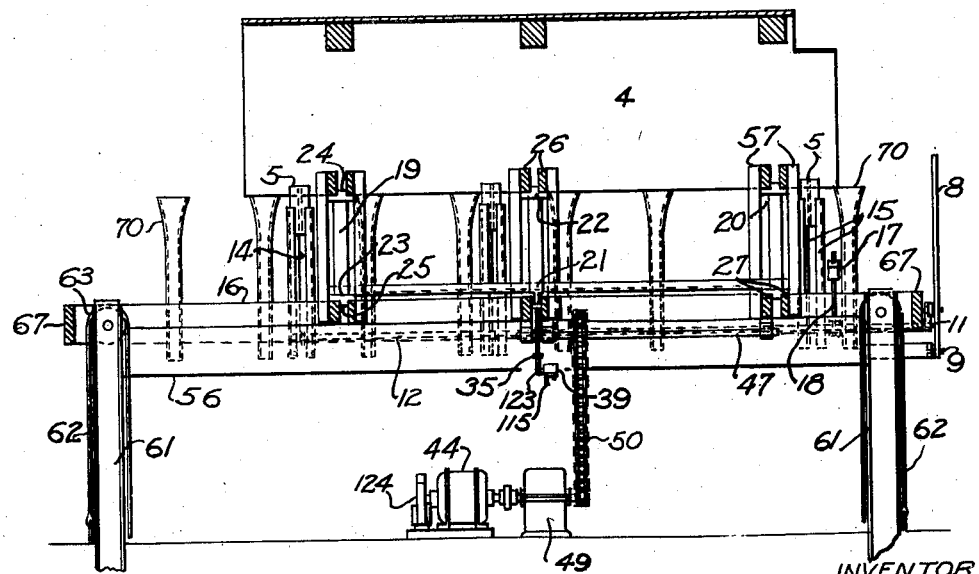
Fig III

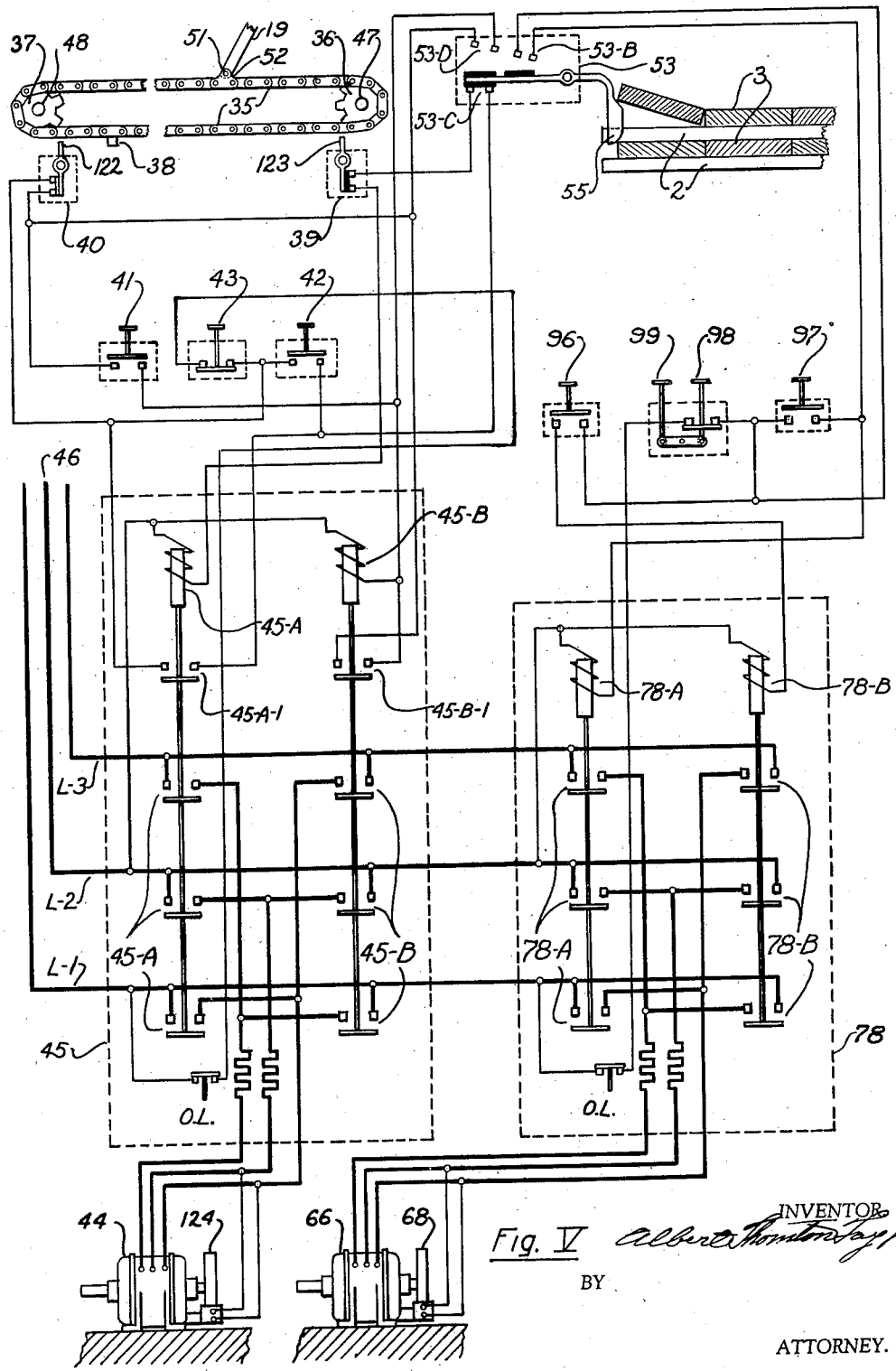

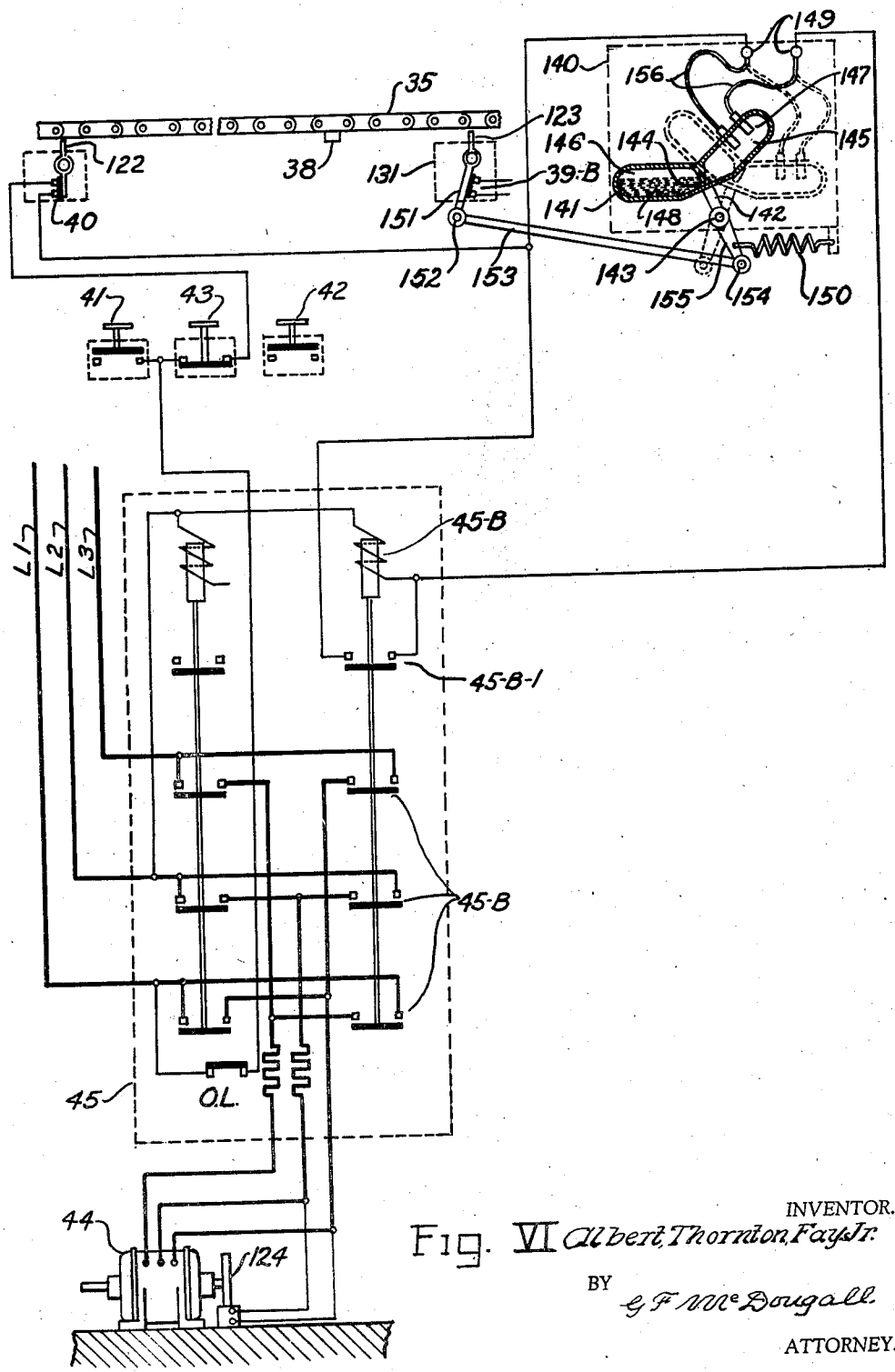

Patented Dec. 29, 1936

2,065,673

UNITED STATES PATENT OFFICE 2,065,673

STACKER OR LOADER

Albert Thornton Fay, Jr., Portland, Oreg.; Pauline Fay, administratrix of said Albert Thornton Fay, Jr., deceased, assignor to Moore Dry Kiln Company of Oregon, North Portland, Oreg., a corporation Application July 25, 1932, Serial No. 624,521

22 Claims. (Cl. 214—6)

My invention relates to improvements in stackers or loaders and in the art of stacking or loading materials, such, for example, as lumber.

An object of my invention is to provide a novel stacking machine, simpler in construction and operation than other machines used for a similar purpose.

Another object of my invention is to provide a novel machine which stacks or loads materials, for example, such as lumber on kiln trucks, cars, buggies, or bunks, one tier at a time employing an inclined skid to aid in putting each tier on the stock load.

Another object of my invention is to provide a novel loading skid, for a stacker or loader, with means for effective reciprocation of the said loading skid in which the skid retracts from under a tier of material resting on it and evens one side of the load.

Another object of my invention is to provide a novel rake means, which may cooperate with the loading skid to rake a tier of lumber, for example, off the loading skids onto a stock load one at a time.

Another object of my invention is to provide a novel mechanism for controlling the movement of the loading skid in the stacking operation.

Another object of my invention is to provide a novel method and a novel and more efficient manner of stacking materials with a novel method of control.

Another object of my invention is to provide a novel and compact stacker for lumber comprising an inclined apron, and an inclined skid which reciprocates underneath the apron and above a stock load beyond the lateral limits of the load, providing an operator's platform at one side of the stacker for its operation and for the placing of stickers.

Another object of my invention is to provide a novel means to even up the two sides of a stock load.

What constitutes my invention will be hereinafter specified in detail and succinctly defined in the appended claims.

The accompanying drawings wherein my invention is illustrated in present preferred form of embodiment—

Figure I is a transverse vertical section of one of my stackers illustrating the loading skid partially retracted and also indicating the loading skid above the stock load.

Figure II is a partial plan view of Figure I.

Figure III is a longitudinal vertical section taken along the lines III—III of Figure I.

Figure IV is a front elevation of Figures I and II.

Figure V is a diagrammatic electrical wiring diagram indicating a control system for the operation of my stacker.

Figure VI is a partial diagrammatic electrical wiring diagram illustrating a delay circuit for the control of the reciprocable loading skid.

In my stacker material such as lumber, for example, may be supplied directly preferably by gravity, to the retractable loading skid when it is in position above the stock load. It is by the retraction of the loading skid that the tier of lumber is laid on the stock load. Rake means, or its equivalent may be provided at one edge of the stock load to aid in causing the tier of lumber to be deposited on the stock load during the backward travel of the loading skid, and to aid in evening the edge of the tiers on both sides of the stock load.

My stacker or loader is preferably used to stack or build up a stock load on an elevator, and also may be fed from any supply of material, for example, one maintained at a constant level by a hoist.

In the following description of the stacker and its operation reference is made to the stacking of lumber. It is to be understood, however, that this reference is for illustration only and the stacker may be employed for stacking other materials than lumber; and that the stacker may be employed for stacking or loading materials with stickers between layers, or solid loads without stickers.

Referring to the numerals on the drawings—
1 indicates a stock load of lumber being stacked; 2 stickers providing spaces between tiers, and 3 a tier of lumber or other material being stacked on the stock load 1.

The stacker proper may comprise an apron 4, a stop 5, and a retractable or reciprocable loading skid 6, with appropriate mechanism for their operation.

The apron 4 may be in an inclined position steep enough for a tier of lumber to slide on it, preferably supported by any suitable means as by the hoist skids 81, and the extension posts 57, above the beam 56 supported by the elevator posts 61. The apron 4 serves for accumulation and measuring of the tier of lumber 7, ready to be stacked. In some cases the apron may be level and have means on it for conveying the tier from it, instead of allowing it to slide off by gravity.

I preferably provide a stop 5 at one edge of the apron 4, which divides the surface of the apron from the surface of the loading skid when it is positioned above the stock load. The stop 5 may be lowered and raised by any suitable means as, for example, manually by the movement of the lever 8 fulcrumed on the shaft 9. The stop 5 may be lowered to release a tier of material to be loaded from the apron 4 to the loading skid 6, by pulling the lever handle 8. The connecting rod 10 connects the lever 8 with a lever arm 11 mounted on the shaft 12, to which lever arms 13 are attached, each of which is connected by connecting rods 14, or other suitable means, to a series of stops 5, which may have their movement directed by the spaced guides 15, or any suitable guide means which may be mounted, for example, at one side of the stock load 1, on the longitudinal beams 16. The guides 15, also may serve as a rake means for the tier of lumber 7, during the backward movement of the loading skid 6. One or more suitable counterweights 17, preferably on a lever arm 18 fulcrumed preferably on the shaft 12, are adjustable to raise the stop 5 automatically in the desired manner to the upward position above and at one edge of the apron 4, when the operator releases the hand lever 8. It is understood that any well known means suitable for the purpose may be employed instead of the mechanism described above.

Below the apron 4 is a reciprocable loading skid 6, the top surface of which is an extension of the surface of the apron 4 when the skid 6 is positioned in the extreme forward position of travel above the stock load. The skid 6 may comprise a plurality of frames having a skid surface or having gravity rolls to aid in discharging material therefrom. Each frame or skid arm may comprise the struts 19, and the chords 20 and 21. The loading skid frames operate together and may be joined together as one unit to form the skid 6, by means of the transverse members 71, 72 and 73. Each loading skid frame is preferably guided by shoes or bearing members 22 and 23, attached respectively in any suitable manner to the top and bottom portions of the loading skid, and preferably on members such as the chords 20 and 21. The shoes 22 and 23 are preferably provided with tongues, or other suitable means 24 and 25 respectively, controlled by the loading skid guide members 26 and 27, for guiding the movement of loading skid frames in their reciprocating motion. The loading skid guide members 26 and 27 may be structural members, or other means, which guide the movement of the top and bottom members respectively of each loading skid frame on its forward and backward movement. The loading skid guide members 26 may be supported at one end by the beam 28 and at the other end by the extension posts 57. The loading skid guide members 27 may be supported at one end by the beam 29 and at the other end by the beam 56 which is attached to the elevator post 61. The loading skid tongues 24 and 25 may have a closely operative fit in the guide members 26 and 27 which control the horizontal reciprocating movement of the loading skid; however, in some installations particularly for loading solid stacked loads of lumber, for example, I preferably provide some vertical movement of the nose 30 of each of the loading skid frames so that the loading skid will conform to the level of the top of the stock load. The nose 30 preferably has a roller or runner means 32 near its end, which allows it to ride on the top of the stock loads 1, thus maintaining a fairly constant space between the end of the loading skid and the top of the stock load, regardless of irregularity in the top surface of the stock load. The runner or roller 32, for example, may roll on the extension 33 of the guide member 27 beyond the stock load in the backward travel of the loading skid.

A plurality of frames of the loading skid 6 are preferably provided with a substantially horizontal extension each at its lower end comprising pullback arms 34. These arms preferably extend beyond the stock load when the stacking skid is above the stock load, and are retracted beyond the opposite side of the stock load when the stacking skid is under the apron. When retracted the pullback arms 34 pull the last board or boards of each tier on the loading skid back against the stop guides 15, or the sticker guides 70 when the stop guides 15 are not in use. This evens the alignment of the tiers on one side of the load and in so doing actuates the trigger 55 which controls the operation of the switch for lowering the elevator.

The loading skid is preferably attached or otherwise operatively connected to a reciprocating member, for example, to a chain 35, by pin 51 in the special connecting link 52. The chain 35 is enmeshed with the sprockets 36 and 37, the sprocket 36 being operatively connected to a source of driving power. The chain 35 is preferably provided with a lug 38, illustrated on the bottom run and which, when the stacker is in operation, may move between two limit switches 39 and 40, spaced to automatically limit the travel of the loading skid. The reciprocation of the loading skid may be operated manually or automatically, mechanically or electrically.

In one plan of operation, when the loading skid is moving forward, the lug 38 reaches limit switch 40, trips the trigger 122, breaks the circuit and automatically stops the motor or other means 44, driving the chain 35, stopping the loading skid in the forward position.

After a tier of lumber which may vary in width is released onto the skid 6, which is in the forward position, by the operator, the latter then presses the push button 42, which operates the contactor 45—A through the circuit from one side of the line (L1), through the OL contacts, the stop button 43, the push button 42, the contacts 53—C of the limit switch 53, the contacts 39, and the contactor 45—A of the reversing line starter 45, to the other side of the line (L2). This closes the contactor 45—A to energize the motor 44 to run the skid 6 backward, and also closes the auxiliary contact 45—A—1 on the contactor 45—A, which is closed when the contactor 45—A is closed, so as to maintain the above circuit, except that it is now through the auxiliary contact 45—A—1 instead of through the push button 42, allowing the push button 42 to be released. When the loading skid moves backward, the lug 38 reaches the limit switch 39, trips the trigger 123, breaks the circuit and automatically stops the chain 35 with the loading skid in the back position. The chain 35 can be restarted in either direction of movement, either forward or reverse, by the starter push buttons 41 and 42, respectively, which control the operation of the motor 44 through a suitable reversing line starter 45, receiving electrical energy through lines 46 from a power source not shown. The push button 41 may be used to start the forward movement of the loading skid. The stop button 43 stops the movement of the loading skid at any position at will. The push buttons 41, 42 and 43 may be mounted on the operator's platform 92.

The shafts 47 and 48 on which the sprockets 36 and 37 respectively are mounted, may be rotated by any suitable means, such as the motor 44, by means of a reduction gear unit 49 and a chain drive 50.

The shafts 47 and 48 are supported by suitable bearings 93 and 94 respectively, mounted on the guide members 27. Suitable brackets 115 and 116 attached to the beams 29 and 56 respectively, may be provided for the attachment of the limit switches 39 and 40, which may control the operation of the loading skid.

In some cases I preferably employ the switch 39 as an emergency limit switch only, instead of as a stopping switch for each cycle of movement of the loading skid. The limit switch 39, in this case, is set to operate the motor 44 only after the limit switch 53 has failed to function. In this case, as illustrated in Figure V, when the loading skid moves to the full backward position, before the lug 38 strikes the trigger 123, the last board of the tier being dropped on the stock load 1, operates the limit switch 53, to open the contact 53—C normally closed, but opened when 53 is operated, and also opens the control circuit of the motor 44 and insures that the motor 44 will not operate until the stock load has been lowered and the trigger 55 of the limit switch 53, has been cleared. At the same time the contact 53—C is opened, contacts 53—B and 53—D, which are normally open, are closed. The limit switch 53 is mounted on any suitable support above the stock load, as, for example, on the bracket 95 on the beam 16.

As soon as the contacts 53—B close, the circuit is closed, in order to lower the platform 60, to the contactor 78—A from L1 through the overload relay, OL contacts, the stop button 98, the contacts 53—B, the contactor 78—A, to L2. The contactor 78—A closes its contacts, which energize the elevator motor 66 to lower the stock load until the last board of the tier 3, is lowered below and releases the trigger 55 of the limit switch 53, and again close the contact 53—C, and open the contacts 53—B and 53—D. Opening the contact 53—B stops the motor 66 and the platform 60.

As soon as the contacts 53—D are closed, the control circuit is set up to operate the motor 44 to move the skid 6 forward, by energizing the contactor 45—B through OL, the push button 43, the contacts of the limit switch 40, the contacts 53—D, the auxiliary holding coil 45—B to the other side of the line L2. When the lug 38 on the chain 35 strikes the trigger 122 on the limit switch 40, the circuit is opened to stop the motor 44. The skid 6 is stopped in the extreme forward position. The contactor 45—B is held in contact by the auxiliary contacts 45—B—1 on the contactor 45—B, after the contacts 53—D are opened. The stacking skid 6 remains in the forward position until the operator releases a new tier of boards and again presses the button 42. The stop push buttons 43 and 98 and the push button 95 are employed to raise the elevator only for non-automatic operation of the stacker. The push button 99 is a reset button for the stop button 98.

The stock load 1 may be stacked or loaded on any suitable platform, but I preferably provide elevating means represented by an elevator or lift, comprising a platform 60 suspended from the elevator post 61, by a cable 62, which passes over the sheaves 63, mounted on the elevator posts 61, and is wound around the drums 64. The drums 64 are preferably keyed on the shaft 65, which is rotated by the motor 66 through a suitable speed reduction unit 67, by means of a chain drive 58. The motor 66 is provided with a suitable brake 124 to stop the movement of the elevator platform 60 quickly and hold it stationary when the motor 66 is not in operation. The elevator 10 may be lowered as the successive tiers of lumber, or other material is stacked upon the stock load 1 by an automatic upper limit switch 53, operated by the last board in each tier of stock. When the last board is pulled back to even the side of the stock load, it strikes and actuates the switch 53 to start the motor 66, to lower the elevator platform 60, until the limit switch 53 is released by the lowering of said tier below it. The elevator preferably reaches the bottom of travel after the stock load is fully stacked, when the lug 100, mounted on the platform 60, strikes the trigger 101 of the lower limit switch 54, stops the elevator automatically. The position of the lower limit switch is preferably low enough to permit the stickers 2, to clear the sticker guides 69, and 70, so that the stock load may then be discharged from the platform 60. The empty platform 60 may be raised again by actuating the push button 96, to make the circuit to actuate the switch 78, reversing the motor 66 when desired, or after the stock load has been discharged from said platform 60 and new trucks and bunks are placed thereon for stacking another stock load. The push button 97 makes a circuit to actuate the switch 78, to start the motor 66, to raise the platform 60.

I preferably provide an emergency stop 98, with reset button 99, for the elevator, which is an electrical push button and may be used at will to stop the elevator at any time or at any position.

The stock load 1 is preferably stacked on suitable bunks 75 mounted on trucks 76, which roll on the track rails 77, which are on the platform 60, and connect with tracks which extend to the kilns, for example.

The elevator, or other means for maintaining the platform 60 at the stacking level, may be of any well-known construction suitable for the purpose.

The main elevator supporting structure may also be used as a support for the stacker proper. The main frame preferably comprises vertical posts 61 at four corners supporting a horizontal frame comprising, transverse beams 67, and longitudinal beams 16 and 68, which may also support sticker guides 69 and 70, and the limit switches 53 and 59.

I also preferably provide a hoist for aid in feeding boards, for example, from a solid stacked package 80 of lumber, which may be raised or lowered to maintain the top of the package of lumber at the breaking down position to be fed to the stacker. It is understood that this hoist is not necessarily an essential part of the stacker, but offers one convenient method for supplying lumber to the stacker. Any suitable method, such as supply chains, incline transfers, etc., may be used for the purpose of bringing the lumber or material to the stacker or loader in units as shown, or bringing boards individually. The hoist, however, may be supported by the hoist skids 81 and suitably driven by an electric motor 82, by means of a reduction gear 83, a chain drive 84, a driven shaft 85, mounted in bearings 90, and having a drum 86, to which a cable 87, or other suitable means is attached, and is passed over the sheave 88 mounted at the top of the hoist skids 81, and passed down, and is connected to the hoist platform 89, in such a way that by rotation of the shaft 85, the cable 87 is wound up on the drum 86, and the hoist platform 89 is raised, as illustrated in Figure I. When the motor is reversed, the reversal of the rotation of the shaft 85 permits the cable to unwind, thus lowering the hoist platform 89. The brake 79 of any usual design, stops the motor 82 when the circuit to the motor is broken.

The hoist skids 81 may be a part of the supporting structure for the stacker as indicated in Figure I.

I preferably provide means for evening the side of the stock load on the side from which lumber, for example, is supplied to the stacker. This means is preferably a pullback arm extension 34, on the loading skids 6, which pulls the last board of each tier deposited on the stock load back to the edge of the stock load against the sticker guides 70, or the rake means 15, in line with the tiers of lumber stacked previously. An advantage of this arrangement is the necessity of using greater length of travel for the loading skid which would permit an interval of time and a greater length of movement for the loading skid, for the placing of stickers by the operator or the manipulation of the controls of the stacker when they are needed.

The rake means 15 is preferably the full height of the loading skid and may be used to even the edge of the load, to rake the tier off of the loading skid or both.

In some cases the steepness of the loading skid is such that a tier tends to slide on it, and during the retraction of the loading skid, the said tier slides off onto the top of the stock load. The pullback arm 34 pulls the last board in each tier against the sticker guides 70.

The length of the loading skid and its length of travel may be varied at will to suit different width stock loads and also to vary the lengths of time for the placing of the stickers from any suitable source of supply on the stock loads.

I preferably provide sticker guides 70 on the side of the load having the rake means 15, both of which are substantially the same height. These sticker guides are preferably shaped like a channel, facing the load, and have their flanges flared so that they are further apart at the top. For example, when the loading skids start backward, the operator can then place stickers on the top of the tier 7, while it is still on the loading skid and before it is laid on the stock load 1. By placing the stickers in their approximate position, the stickers will be lowered as the tier is lowered on the stock load, and their ends will be guided to their proper location on the stock load, due to the downwardly narrowing flanges of the sticker guides.

The sticker guides 69 and 70 are not used when loads are stacked without stickers, however, in this case, they may be used as stops to even the side edges of the loads.

I preferably provide electrically operated brakes 124 on the motors for the elevator, the hoist and the stacker, which, when the motors are energized, the brakes are released, and when the electrical current is cut off of the motors, the brakes are set to stop the rotation of the motors respectively, almost immediately.

In some cases I preferably provide other delay means for reversing the movement of the loading skid, such as a commonly used type of delay mercury switch to allow an elapse of time between the stopping of the chain 35 and a reversal of its movement.

The delay mercury switch 140 comprises a mercury tube such as for example, the tube 141 mounted on an arm 142 which is pivoted on a pin 143. The mercury tube 141 is shown as a V shaped tube, but a straight tube may be used if desired. The mercury tube 141 is provided with a restricted opening 144 connecting two chambers, 145 and 146. Chamber 145 is equipped with two electrodes 147. The mercury tube 141 is partially filled with mercury 148. Flexible wires 156 connect the outer ends of the electrodes 147 to terminals 149. The operation of the delay mercury switch is as follows: When the lug 38 on the chain 35 contacts the trigger 123 on the limit switch 131, the contacts 39—B are opened to immediately stop the motor, with the skid in the backward position. The mercury tube 141 of the delay mercury switch 140, is tilted to the position indicated by dotted lines. This tilting of the tube 141 is accomplished by means of a lever 151 on the limit switch 131, connected by the pin 152, the link 153, the pin 154, to the arm 155 of the mercury switch 140. When the mercury tube 141 is tilted to the position indicated by dotted lines, the mercury 148 flows through the restricted opening 144 from the chamber 146 into chamber 145 at a predetermined rate of speed regulated by the size of the restricted opening 144. The level of the mercury in the chamber 145, gradually rises and makes an electrical contact across the electrodes 147, setting up an electrical circuit from one side of the line L1 through OL, the stop button 43, the contact of the limit switch 40, through the electrodes 147 of the mercury switch 140, through the contactors 45—B to the other side of the line L2, starting the motor 44 to move the skid 6 forward, after a predetermined delay. The amount of delay may be regulated by the size and mercury capacity of the chambers 145 and 146.

As the skid 6 moves forward, the lug 38 on the chain 35, releases the trigger 123 on the limit switch 131, and the mercury tube 141 is allowed to return to its normal position under the influence of the spring 150, and the mercury 148 in the chamber 145, returns to the chamber 146 by gravity. The contactor 45—B is held in contact by the auxiliary contactors 45—B—1, after the circuit across the electrodes 147 is broken.

It is understood that the incline position of the apron 4, and the degree of declination of the loading arms 6, may be varied at will. They are shown to provide a sliding angle in the apron 4—that is, at an angle at which lumber will slide off easily onto the loading skids 6.

In some of my stackers I preferably eliminate the break-down hoist and feed the stacker by a chain on which a continuous sheet of lumber will be supplied to the stacker. In this case the apron 4, and the loading skid 6, may be flatter than illustrated in Figure I. This arrangement is illustrated in my co-pending application, Serial No. 628,666. Since it will not be necessary for the lumber tier 7 to slide thereon into position above the stock load 1, the movement of the chain supplying the sheet of lumber may thus be operated and controlled by the hand lever 8. When the supply chains are moving, the sheet of lumber would be moved into position along the supply chains, the apron, and the loading skid.

In some of my stackers I employ a supply conveyor for a sheet of lumber, for example, having conveying means for supplying said sheet of lumber to my stacker. When this design is used, I preferably employ an overhead stop mechanism and a mechanism for segregating tiers of lumber to be stacked on the stock load, as described in my application Serial No. 628,666.

I preferably provide any suitable means for evening one end of the lumber to be stacked, for example, I show an adjustable guide 129 which parallels the movement of the lumber on the apron 4. It is preferably adjustable to provide for different length of lumber to be stacked and serves to even up one end of the lumber. It is understood that any well-known or suitable means may be provided for this purpose.

Stickers may be placed on the stock loads when desired, in any manner preferable.

Figure I illustrates the loading skid partly retracted, while the dotted portion indicates the skid in the extreme forward position.

The operation of my stacker may be as follows: Lumber may be supplied in packages and broken down from a hoist to provide a sheet of lumber, which may be deposited directly on the loading skid 6, or on the apron 4, in which case it may be stopped by the stops 5, in position at one edge of the apron 4. By manual control of the lever 8, or other control the stops 5 may be made to recede below the surface of the apron 4, and below the lumber tier accumulated thereon. The tier therefore will move forward by gravity, or other means, until it strikes the tier-stop, or sticker guides 69, which evens this side of the stock load. The operator may then release the lever 8 to allow stops 5 to be raised automatically by the counterweight 17, and catch the following tier of lumber. The operator may actuate the control button 42, unless the trigger 74 of the limit switch 59, mounted on the tier-stop 69, is tripped, each of which operations may make the circuit to start the motor 44, to cause the top run of the chain 35, to move backwards, and to draw the loading skid 6 and the pull-back arms 34 backward with it. As the loading skid retracts, the tier of lumber 7 at its upper edge may strike against the front side of the stop guides forming the rake means 15, so that the loading skid is withdrawn from beneath the tier of lumber 7, depositing it upon the stock load 1. The pullback arms 34 pull the last board, or boards, for example, back against the sticker guides 70, to even this side of the stock load. This last board strikes the trigger 55 and actuates the upper limit switch 53, making the electrical circuit to lower the elevator platform 60, until the trigger 55 of the switch 53 is released to close the contact 53—C, to move the loading skid 6 forward, and open the contacts 53—B and 53—D, to stop the elevator platform 60.

If automatic reciprocation of the loading skid is not desired, the lug 38 on the chain 35, may engage the trigger 123, breaking the circuit to the limit switch 39, stopping the motor 44, and the stacking skid 6, at the backward limit of its travel. The momentum of travel is retarded by a suitable brake 124, preferably of any usual design, electrically operated on the motor 44.

In this latter case, the forward movement of the stacking skid may be started automatically, or by the actuation of the control button 41, which controls the reversing line starter 45, and makes the electrical circuit which automatically releases the brake 124 and starts the motor 44, causing the chain 35 to move the stacking skid 6, forward until the lug 38, on chain 35, trips the trigger 122, opening the limit switch 40, breaking the electrical circuit to the reversing line starter 45, which in turn breaks the electrical current to the motor 44, stopping the movement of the stacking skid 6 at the forward position of travel. The momentum of the loading skid is stopped by the brake 124, by the breaking of the electrical circuit operating the motor 44.

Stickers 2, may be placed on the stock load at suitable intervals in the sticker guides 69 and 70, when the stock loads are stacked for drying. Stock loads may be stacked without stickers for other purposes than for drying.

After the stock load is fully stacked, it may be lowered so that the top is clear of the sticker guides and the load removed. The platform 60 may be automatically stopped at its bottom limit of travel by lug 100, striking the trigger 101, of the lower limit switch 54, stopping the motor 66. New trucks and bunks may be set up and the elevator platform may be raised by actuating the push button 96.

It is understood that this invention is not limited to the exact design and form illustrated and described. Modifications of the principles herein described, and mechanical equivalents are self-evident to those skilled in the art; therefore, it is to be understood that the invention includes within its scope whatever changes fairly come within either the terms or the spirit of the appended claims.

Having described my invention, what I claim is:

1. In a stacker the combination with a reciprocable inclined loading skid, an elevator having a platform, said skid being above and to one side of the elevator platform which is adapted to hold a stock load, an apron having a top surface as an extension of and at a different incline than the surface of said skid when the latter is above said platform, the apron surface being above said skid when the latter is to one side of said platform, a stop means at the lower edge of said apron adapted to hold a tier of material on said apron, means for the control of the movement of said skid, means for the control of the movement of said elevator platform, said means being responsive to the positioning of the last board in said tier of said material, said stop and said controls being alternately operative in the stacking operation.

2. In a stacker the combination of an inclined supply means for a tier, an inclined skid reciprocable beneath said supply means and to one side thereof above a stock load, an elevator operatively mounted and equipped to maintain the top of said stock load at substantially a predetermined stacking level, means for releasing the tier from said supply means to said skid when said skid is above said stock load, stop members on each side of said stock load, and means for actuating reciprocation of said skid under said supply means whereby said tier is stacked within lateral limits on said stock load.

3. In a stacker the combination of inclined supply means for a tier, an inclined skid reciprocable beneath said supply means and to one side thereof above a stock load, an elevator operatively mounted and equipped to maintain a pre-top of said stock load at substantially a predetermined stacking level, means for releasing the tier from said supply means to said skid when said skid is above said stock load, means for actuating reciprocation of said skid under said supply means, said tier release means also functioning as a rake means for raking said tier from said skid to the top of said stock load.

4. In a stacker, an inclined stacking skid comprising a plurality of skid arms, an extension at the lower end of a plurality of said skid arms, guide members for a substantially horizontal reciprocating movement of said skid and said extension thereof above and to one side of a stock load, stops extending above said skid extensions defining lateral load limits, means for placing a tier of material on said skid, means for reciprocating said skid, thereby placing said tier on said load and evening the edges of said tier.

5. In a stacker, an inclined stacking skid comprising a plurality of skid arms, a substantially horizontal extension at the lower end of a plurality of said skid arms, guide members for a substantially horizontal reciprocating movement of said skid and said extension thereof above and to one side of a stock load, means for maintaining a substantially constant stacking level for said load, stops independent of said skids and extending above their top surface when the skids are positioned above said stock load to determine the lateral limits of the load, a trigger of a switch in front of one of said stops for actuating said load level maintaining means said trigger being responsive to the positioning of the last board of each tier stacked on said stock load, means for placing a tier of material on said skid, means for reciprocating said skid, thereby placing said tier on said load, evening one edge of said tier and actuating said load level maintaining means.

6. A stacker comprising a horizontal frame supported by a main frame, a reciprocable loading skid above said horizontal frame, an elevator platform within said main frame, said skid having a sloping top surface, sticker guide means on two sides of said horizontal frame bounding the sides of a stock load and adapted to space stickers between tiers of material making up said stock load, means for maintaining a substantially constant level of the top of the stock load on said platform, said means being actuated by a tier, means for reciprocating said skid from above said stock load, whereby material deposited on said skid is stacked on the top of said stock load with the aid of gravity.

7. A stacker comprising a main frame, a horizontal frame thereon, an operator's platform at one side of said horizontal frame, an elevator beneath said horizontal frame, a stacking skid having a sloping top surface, means for reciprocating said skid above said elevator platform and to the side of said platform opposite said operator's platform, said elevator platform being adapted for the stacking on it of a series of tiers to make the stock load, means for maintaining a substantially constant level for the top of said stock load, said means being responsive to the positioning of the last portion of said tier, means for placing material on said stacking skid while it is positioned above said platform, and means for evening the two sides of said stock load, whereby a tier of said material may be stacked within lateral limits on said stock load by reciprocation of said loading skid.

8. A stacker comprising an inclined loading skid reciprocable above and to one side of a stock load, an elevator for maintaining a substantially constant stacking level for tiers of material on said stock load, a substantially horizontal nose extension for said skid, means for the control of the movement of said skid within lateral limits, means for the control of the vertical movement of said elevator responsive to the stacking of the last portion of said tier on said stock load.

9. A stacker comprising an apron, a loading skid above a stack load and having a surface as an extension of the surface of said apron, an elevator, means whereby said skid is reciprocable beneath said apron and above said elevator, a stop means dividing the surfaces of said apron and said skid, and adapted to hold a tier of material on said apron, means for release of said tier to said skid, means for the reciprocation of said skid, means for the control of the movement of said elevator platform, said means being actuated by stacking said tier on a stock load on said elevator, and means for actuating reciprocation of said skid, whereby said tier is stacked on said stock load.

10. A stacker comprising an inclined loading skid, consisting of a plurality of skid arms, reciprocable above and to one side of a stock load, an elevator having a platform, an inclined apron having a surface as an extension of the surface of said skid while it is above said platform, means for alternately holding a tier of lumber on said apron and releasing it to said skid, means for actuating reciprocation of said skid, means for the control of the movement of said elevator platform which is adapted to receive a stock load, sticker guides on two sides of said stock load and extending above the top surfaces of said skid when it is above said elevator platform and means comprising an extension on a plurality of said skid arms, whereby the successive tiers of one of the sides of said stock load are substantially vertically aligned in the stacking operation.

11. A stacker comprising an inclined loading skid, an elevator having a platform, an inclined apron having a surface as an extension of the surface of said skid while it is above said platform, a movable stop means at the lower edge of said apron, means for the reciprocation of said skid beneath said apron alternately above and to one side of said stock load, control means for the control of the movement of said elevator platform, which is adapted to receive a stock load, said control means being actuated by the stacking thereon of a tier of material, sticker guides on opposite sides of said elevator platform independent of said skid and extending above the surface of said skid when said skid is above said stock load, said guides defining lateral limits for the sides of said stock load, pullback means actuated by the reciprocation of said skid, whereby said material is stacked on the top of said stock load.

12. In a stacker an inclined apron, a movable stop at the lower edge of said apron, a loading skid comprising a plurality of inclined skid arms, means for reciprocation of said loading skid underneath said apron and above a stock load an elevator operatively mounted for maintaining a substantially constant stacking level for said stock load, means of actuating said stop to release a tier from said apron to said skid when it is above said elevator, stop means at the two sides of said skid, pullback means on the edge of said skid opposite said apron when above said stock load for causing a portion of material thereon in each reciprocation to be pulled against one of said stop means, thus depositing material on the stock load within the same lateral limits, in each reciprocation of said skid.

13. In a lumber stacker the combination of a vertically movable platform, a plurality of skid arms comprising a stacking skid, an inclined apron elevated at one side of said platform, said stacking skid being reciprocable alternately above said platform and beneath said apron, sticker guides on a horizontal frame on opposite sides of said platform, said guides comprising stops for tiers of material of a stock load, control means for the release of a tier from said apron, and controllable means for the reciprocation of said skid.

14. In a stacker, a horizontal frame having sticker guides on two sides thereof serving as stop members for tiers of a stock load within said frame, an inclined stacking skid above said frame, said sticker guides extending above the lower end of said skid when said skid is above said frame, means for reciprocating said skid alternately above and to one side of said frame beyond said stops on two sides thereof respectively, and means for pulling a portion of said tier against the stop on one side of said load, whereby said tier is stacked on said stock load.

15. In a stacker, a horizontal frame, stop members on two sides thereof for tiers of a stock load, an elevator beneath said frame adapted for supporting the stock load, an actuating switch controlling the movement of said elevator and having a trigger in front of one of said stops, an inclined stacking skid above said elevator, means for supplying a tier of lumber on said skid, means for reciprocating said skid alternately above said load and to one side thereof whereby said tier is stacked on said stock load, means for pulling a portion of said tier against said stop and said trigger on one side of said load, thereby evening one side of the stock load and actuating said elevator to maintain a substantially constant stacking level substantially as specified.

16. In a stacker, a horizontal frame having sticker guides, stop members on two sides thereof for tiers of a stock load, an inclined apron higher than and to one side of said frame, a reciprocating inclined loading skid above said frame, means for releasing a tier of lumber from said apron to said skid, means for retracting said skid beneath said apron whereby said tier is stacked on said stock load against stop members on one side of said load, means for pulling a portion of said tier against the stop members on the other side of said load, and means for the positioning of said skid for stacking another tier.

17. In a stacker the combination of an elevated inclined apron having means for measuring and holding a tier, an inclined skid reciprocable below said apron and to one side thereof above a stock load an elevator providing support for said stock load, a horizontal frame on two sides of said elevator and lower than said skid, said frame having stop members extending above the top surface of said skid when the skid is above said elevator, means actuated at the side of said frame opposite the said apron for releasing a tier from said apron onto said skid when the skid is above said stock load, means for retracting said skid under said apron, means for lowering said elevator to maintain the constant level of the top of said load, and means for moving said skid forward above said load.

18. In a stacker an elevated material supply means on one side of a stock load, an inclined skid reciprocable below said supply means and to one side thereof above said stock load supported by an elevator, a horizontal frame on two sides of said elevator below said skid, said frame having stop members extending above the top surface of said skid, for defining lateral limits for said stock load, means controlled at the side of said frame opposite said supply means for the reciprocation of said skid, and means for evening the side of the load last stacked.

19. In a stacker the combination of an elevated inclined apron having means for measuring and holding a tier, an inclined skid reciprocable below said apron and to one side thereof above a stock load, an elevator for maintaining the top of said stock load at a substantially constant level, the inclines of said apron and said skid being different, a horizontal frame on two sides of said elevator and below said skid, said frame having stop members extending above the top surface of said skid when said skid is above said load, means controlled at the side of said frame opposite the said apron for releasing a tier from said apron onto said skid when the skid is above said load, means for retracting said skid under said load, means for evening the side of the said apron, means for lowering said elevator to maintain the constant level of the top of said load, and means for moving said skid forward above said load.

20. The method of stacking which consists of successively measuring a tier of lumber comprising a plurality of boards on an inclined apron, of releasing said tier to an inclined skid while said skid is above a stock load, of placing said tier with boards substantially edge to edge on said stock load, and simultaneously therewith, of measuring another tier on said apron, of pulling back a portion of said tier against a stop to even one side of the load and to maintain a substantially constant load level, and then of repeating the operation.

21. The method of stacking which consists of successively measuring a tier of random width lumber comprising a plurality of boards on an inclined apron, of releasing said tier to an inclined skid while said skid is above a stock load, of placing said tier with boards substantially edge to edge on said stock load, and simultaneously therewith, of measuring another tier on said apron, of pulling back a portion of said tier against a stop to even one side of the load and to maintain a substantially constant load level, of placing stickers on said tier and then of repeating the operation.

22. In a stacker having an elevator for maintaining the top of a stock load at a substantially uniform stacking level, the combination of, a supply apron, a stacking skid, means for reciprocation of said skid alternately above said load and to one side thereof beneath said apron, a stop for variable width tiers of stock on one side of said elevator, and means for regulating the width of said load regardless of the width of the tier.

ALBERT THORNTON FAY, JR.